United States Patent Office 2,734,924
Patented Feb. 14, 1956

2,734,924

CYCLOALKYLATED BIS-PHENOL DERIVATIVES

Arthur Lambert, Blackley, Manchester, England, assignor to Imperial Chemical Industries Limited, a corporation of Great Britain No Drawing. Application December 8, 1952, Serial No. 324,821

Claims priority, application Great Britain December 19, 1951

8 Claims. (Cl. 260—619)

This invention relates to new compositions of matter, namely, bis - (2 - hydroxy-3-α-alkylcycloalkyl-5-methylphenyl)-methanes in which the cycloalkyl group is a cyclopentyl, methylcyclopentyl, cyclohexyl or methylcyclohexyl one and the alkyl substituent has not more than 4 carbon atoms and is attached to the α-carbon atom of the cycloalkyl group, i. e. the carbon atom which is joined to the phenyl radical.

The invention also relates to the manufacture of these new compounds.

We have found that these compounds are both valuable antiagers for those oils, fats and waxes which tend to deteriorate in the presence of oxygen and valuable intermediates for the manufacture of other compounds, including other antiagers, e. g. metal salts of the above new compounds.

The new compounds are, according to one process of the invention, manufactured in two stages. The first stage consists of combining, in the presence of an acid condensing agent, 1 molecular proportion of p-cresol with 1 molecular proportion of an α-alkylcyclopentene, methyl-α-alkylcyclopentene, α-alkylcyclohexene or methyl-α-alkylcyclohexene, in which the alkyl substituent has not more than 4 carbon atoms. In the second stage, two molecular proportions of the p-cresol derivative, i. e. 2-α-alkylcycloalkyl-4-methylphenol, which is obtained in the first stage, are condensed with one molecular proportion of the formaldehyde or of a substance yielding formaldehyde, in the presence of an acid condensing agent.

As an alternative for the second stage one molecular proportion of the aforesaid p-cresol derivative is condensed with one molecular proportion of formaldehyde in the presence of a basic catalyst and the resulting product combined with one molecular proportion of the same p-cresol derivative in the presence of an acid condensing agent.

As a further alternative for the second stage the p-cresol derivative is substituted by a chloromethyl group by reacting it with one molecular proportion of formaldehyde in the presence of anhydrous hydrogen chloride and the resulting chloromethyl derivative is then condensed with a second molecular proportion of the p-cresol derivative.

These alternatives for the second stage provide convenient ways of manufacturing such of the new compounds of this invention as are not symmetrical, i. e. those compounds in which the two α-alkylcycloalkyl substituents are different.

The new compounds are, according to another process of the invention, manufactured by combining, in the presence of an acid condensing agent, one molecular proportion of bis-(2-hydroxy-5-methylphenyl)-methane with two molecular proportions of a cyclopentene, methylcyclopentene, cyclohexene or methylcyclohexene in which the α-carbon atom carries an alkyl substituent having not more than 4 carbon atoms.

The following examples in which the parts are by weight illustrate but do not limit the invention.

*Example 1*

150 parts of p-cresol were heated with 13.4 parts of concentrated sulphuric acid (S. G. 1.84) at 90–100° C. for ½ hour and then cooled to 40° C. 97 parts of α-methylcyclohexene were added over ¾ hour with stirring at 50° C.–60° C. After stirring at 60° C. for 1 hour, a solution of 30 parts of anhydrous sodium carbonate in 300 parts of water was added and the whole boiled under reflux for 1 hour. The oil layer was separated and washed with a solution of 50 parts of sodium hydroxide in 500 parts of water. This washing was repeated twice. The washed oil layer was then dissolved in a solution of 262 parts of potassium hydroxide in 300 parts of water and 320 parts of methanol. The solution was washed with 3 portions of 100 parts each of light petroleum (B. P. 60–80° C.). The washed solution was diluted with 750 parts of water, acidified by the addition of 500 parts of concentrated hydrochloric acid and extracted with two portions of 175 parts each of ether. Distillation of the combined ethereal extracts gave 2-α-methylcyclohexyl-4-methylphenol, B. P. 150–160° C./10 mm.

A mixture of 40 parts of 2-α-methylcyclohexyl-4-methylphenol, 3.0 parts of paraformaldehyde and 4.1 parts of hydrochloric acid (S. G. 1.18) was stirred at 100–110° C. for 1 hour. The product was washed with water and crystallised from light petroleum (B. P. 40°–60° C.). Bis - (2-hydroxy-3-α-methylcyclohexyl-5-methylphenyl)-methane was obtained as colourless crystals M. P. 140° C.

*Example 2*

This is similar to Example 1 except that α-methylcyclopentene is used instead of α-methylcyclohexene. The intermediate 2-α-methylcyclopentyl-4-methylphenol has M. P. 43–5° C. after re-crystallisation from light petroleum. The final product bis-(2-hydroxy-3-α-methylcyclopentyl-5-methylphenyl)-methane is obtained as a soft colourless resin, B. P. 210–240° C./0.1 mm. which solidifies as a white solid of M. P. 100° C. after recrystallisation from light petroleum (B. P. 60–80° C.).

*Example 3*

This is similar to Example 1 except that αγ-dimethylcyclohexene (made by dehydrating 1:4-dimethylcyclohexanol) is used instead of α-methylcyclohexene. 2-αγ-dimethylcylcohexyl-4-methylphenol has M. P. 102–3° C. Bis-(2-hydroxy-3-αγ-dimethylcyclohexyl-5-methylphenyl)-methane has M. P. 163–4° C.

*Example 4*

This is similar to Example 1, but starts from 1-ethylcyclohexene. 2-α-ethylcyclohexyl-4-methylphenol is obtained with a M. P. of 72–3° C. and bis-(2-hydroxy-3-α-ethylcyclohexyl-5-methylphenyl) - methane with M. P. 174–5° C.

*Example 5*

This is similar to Example 1, but uses 1-n-butylcyclohexene (made by dehydrating 1-n-butylcyclohexanol). 2-α-n-butylcyclohexyl-4-methylphenol, M. P. 53–4° C. and bis - (2 - hydroxy-3-α-n-butylcyclohexyl-5-methylphenyl)-methane, M. P. 114–5° C. are obtained.

*Example 6*

2-α-methylcyclohexyl-4-methylphenol (37 parts) is stirred with a solution of potassium hydroxide (8 parts) in water (20 parts) and formalin (35% solution, 13 parts). Methanol is added until a clear solution is obtained and the solution is set aside overnight. It is then diluted with water and neutralised with acetic acid (8 parts). The oil which separates is taken up in ether and the ether solution is washed with water, dried over sodium sulphate, and evaporated at room temperature and reduced pressure. The residue is a pale yellow viscous liquid consisting substantially of 2-hydroxy-3-α-methylcyclohexyl-5-methylbenzyl alcohol. A solution of this product (13 parts) in petroleum ether (B. P. 60–80° C.) (50 parts) is stirred overnight with 2-α-methylcyclohexyl-4-methylphenol (13 parts) and concentrated hydrochloric acid (2 parts). The solid which separates is filtered off and is bis-(2-hydroxy-3-α-methylcyclohexyl-5-methyl phenyl)-methane.

*Example 7*

Crude 2-hydroxy-3-α-methylcyclohexyl-5-methylbenzyl alcohol (27 parts) in ether (50 parts) is stirred overnight with concentrated hydrochloric acid (160 parts), keeping the temperature below 5° C. by immersing the reaction vessel in ice. The oily product is taken up in ether and the ether layer is separated, washed with water, and dried over magnesium sulphate. The ether is removed at room temperature leaving crude 2-hydroxy-3-α-methylcyclohexyl-5-methylbenzyl chloride as a dark amber coloured syrup. This material (23 parts) is then stirred with a solution of 2-α-methylcyclohexyl-4-methylphenol (23 parts) in petroleum ether (B. P. 80–100° C., 100 parts) until a clear solution is obtained. The solution is set aside. After three days, the solid precipitate which has appeared is filtered off and is bis-(2-hydroxy-3-α-methylcyclohexyl-5-methylphenyl)-methane.

*Example 8*

Bis - (2 - hydroxy - 3 - α - methylcyclohexyl - 5 - methylphenyl)-methane (10 parts) is dissolved in a 4% solution (57.5 parts) of potassium hydroxide in methanol. The solution is warmed to 60° C. and water is added until precipitation commences: 40 parts of water are required. Methanol (10 parts) is then added to redissolve the precipitate. This solution is called solution A. Solution B is prepared by dissolving magnesium sulphate heptahydroate (6 parts) in water (45 parts) and diluting with methanol (70 parts). Solutions A and B are warmed to 60° C. and added simultaneously with vigorous stirring to a flask containing methanol (70 parts) and water (45 parts) heated to 60° C. The white precipitate of the magnesium salt of bis-(2-hydroxy-3-α-methylcyclohexyl-5-methylphenyl)-methane is filtered off, washed with water and dried in an oven at 100° C.

What I claim is:

1. Bis - (2 - hydroxy - 3 - α - alkylcycloalkyl - 5 - methylphenyl)-methanes in which the cycloalkyl group is a member of the class consisting of cyclopentyl, methylcyclopentyl, cyclohexyl and methylcyclohexyl and the alkyl substituent has not more than 4 carbon atoms and is attached to the α-carbon atom of the cycloalkyl group.

2. Bis - (2 - hydroxy - 3 - α - methylcyclohexyl - 5 - methylphenyl)-methane.

3. Bis - (2 - hydroxy - 3 - α - methylcyclopentyl - 5 - methylphenyl) methane.

4. Process for the manufacture of the new compounds claimed in claim 1, according to which there are combined, in the presence of an acid condensing agent, 1 molecular proportion of p-cresol with 1 molecular proportion of a member of the class consisting of α-alkylcyclopentene, methyl-α-alkylcyclopentene, α-alkylcyclohexene and methyl-α-alkylcyclohexene, in which the alkyl substitutent has not more than 4 carbon atoms, and then one molecular proportion of the 2-α-alkylcycloalkyl-4-methylphenol, which is obtained, is condensed with 1 molecular proportion of a member of the class consisting of formaldehyde and a substance yielding formaldehyde, in the presence of a basic catalyst and the resulting benzyl alcohol derivative combined with 1 molecular proportion of 2-α-alkylcycloalkyl-4-methylphenol in the presence of an acid condensing agent.

5. Process for the manufacture of the new compounds claimed in claim 1, according to which there are combined, in the presence of an acid condensing agent, 1 molecular proportion of p-cresol with 1 molecular proportion of a member of the class consisting of α-alkylcyclopentene, methyl-α-alkylcyclopentene, α-alkylcyclohexene and methyl-α-alkylcyclohexene, in which the alkyl substituent has not more than 4 carbon atoms, and then one molecular proportion of the 2-α-alkylcycloalkyl-4-methylphenol, which is obtained, is condensed with 1 molecular proportion of a member of the class consisting of formaldehyde and a substance yielding formaldehyde, in the presence of hydrochloric acid to yield the corresponding benzyl chloride derivative and this then combined with one molecular proportion of 2-α-alkylcycloalkyl-4-methylphenol.

6. Process for the manufacture of the new compounds claimed in claim 1, according to which 1 molecular proportion of a 2-α-alkylcycloalkyl-4-methylphenol, in which the cycloalkyl group is a member of the class consisting of cyclopentyl, methylcyclopentyl, cyclohexyl and methylcyclohexyl and the alkyl substituent has not more than 4 carbon atoms and is attached to the α-carbon atom of the cycloalkyl group, is condensed with 1 molecular proportion of a member of the class consisting of formaldehyde and a substance yielding formaldehyde, in the presence of a basic catalyst and the resulting benzyl alcohol derivative condenses with a second molecular proportion of the 2-α-alkylcycloalkyl-4-methylphenol in the presence of an acid condensing agent.

7. Process for the manufacture of the new compounds claimed in claim 1, according to which 1 molecular proportion of a 2-α-alkylcycloalkyl-4-methylphenol, in which the cycloalkyl group is a member of the class consisting of cyclopentyl, methylcyclopentyl, cyclohexyl and methylcyclohexyl and the alkyl substitutent has not more than 4 carbon atoms and is attached to the α-carbon atom of the cycloalkyl group, is condensed with 1 molecular proportion of a member of the class consisting of formaldehyde and a substance yielding formaldehyde in the presence of hydrochloric acid to yield the corresponding benzyl chloride derivative and this then combined with a second molecular proportion of the 2-α-alkylcycloalkyl-4-methylphenol.

8. Process for the manufacture of the compounds claimed in claim 1, including the step of catalytically condensing 1 molecular proportion of a 2-α-alkylcycloalkyl-4-methyl-phenol, in which the cycloalkyl group is a member of the class consisting of cyclopentyl, methylcyclopentyl, cyclohexyl and methylcyclohexyl and the alkyl substituent has not more than 4 carbon atoms and is attached to the α-carbon atom of the cycloalkyl group, with 1 molecular proportion of a member of the class consisting of formaldehyde and a substance yielding formaldehyde and thereafter condensing the resulting product with a second molecular proportion of the 2-alpha-alkylcycloalkyl-4-methylphenol.

References Cited in the file of this patent

UNITED STATES PATENTS

| | | |
|---|---|---|
| 2,162,172 | Honel et al. | June 19, 1939 |
| 2,430,002 | De Groote et al. | Nov. 4, 1947 |
| 2,440,909 | Niederl | May 4, 1948 |
| 2,628,953 | Newby | Feb. 17, 1953 |

OTHER REFERENCES

Ziegler et al.: Monatschefte fur Chemie, vol. 78 (1948), pgs. 334–342. Abstracted in Chem. Abstracts, vol. 43 (1949) column 5019, 1 pg.